United States Patent
Bergami

(10) Patent No.: US 11,141,689 B2
(45) Date of Patent: *Oct. 12, 2021

(54) VEHICLE PROVIDED, AT THE INTAKE, WITH AN AIR FILTER PROVIDED WITH A HEATING DEVICE

(71) Applicant: BMC S.r.l., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 211 days.

This patent is subject to a terminal disclaimer.

(21) Appl. No.: 16/340,621

(22) PCT Filed: Oct. 20, 2017

(86) PCT No.: PCT/IB2017/056541
§ 371 (c)(1),
(2) Date: Apr. 9, 2019

(87) PCT Pub. No.: WO2018/073804
PCT Pub. Date: Apr. 26, 2018

(65) Prior Publication Data
US 2019/0275457 A1    Sep. 12, 2019

(30) Foreign Application Priority Data
Oct. 20, 2016 (IT) .................. 102016000105840

(51) Int. Cl.
B01D 46/52 (2006.01)
B01D 46/42 (2006.01)
(Continued)

(52) U.S. Cl.
CPC .......... B01D 46/523 (2013.01); B01D 46/10 (2013.01); B01D 46/4263 (2013.01);
(Continued)

(58) Field of Classification Search
CPC .... B01D 46/523; B01D 46/521; B01D 46/10; B01D 46/4263; B01D 2275/206;
(Continued)

(56) References Cited

U.S. PATENT DOCUMENTS 2,879,183 A * 3/1959 Doherty ................. H01B 13/06
427/118
3,408,794 A * 11/1968 Stoddard ................. F24F 13/28
55/282

(Continued)

FOREIGN PATENT DOCUMENTS

DE   10 2007 047403    4/2009
FR   2 594 352         8/1987
(Continued)

*Primary Examiner* — Joseph J Dallo
*Assistant Examiner* — Kurt Philip Liethen
(74) *Attorney, Agent, or Firm* — Leason Ellis LLP

(57) ABSTRACT

A vehicle provided with an engine, at least one air intake through which the engine takes in the external air needed to operate, and an air filter, which is arranged in the area of the air intake; the air filter comprises: at least one wave-shaped filtering material panel; an outer reinforcement mesh, an inner reinforcement mesh; and a heating device which is electrically connected to a group of electrified wires of the outer reinforcement mesh and is designed to cause an electric current to flow through said electrified wires, so as to generate heat, due to the Joule effect, on the inside of said outer reinforcement mesh.

22 Claims, 15 Drawing Sheets

(51) Int. Cl.
   *B64D 33/02*   (2006.01)
   *F02M 35/02*   (2006.01)
   *F02M 35/024*  (2006.01)
   *F02M 35/16*   (2006.01)
   *H05B 1/02*    (2006.01)
   *B01D 46/10*   (2006.01)

(52) U.S. Cl.
   CPC ........... *B01D 46/521* (2013.01); *B64D 33/02* (2013.01); *F02M 35/021* (2013.01); *F02M 35/0245* (2013.01); *F02M 35/16* (2013.01); *H05B 1/0236* (2013.01); *B01D 2275/206* (2013.01); *B01D 2279/60* (2013.01); *B64D 2033/0233* (2013.01); *B64D 2033/0246* (2013.01); *B64D 2033/0253* (2013.01)

(58) Field of Classification Search
   CPC ................ B01D 2279/60; B64D 33/02; B64D 2033/0233; B64D 2033/0246; B64D 2033/0253; F02M 35/021; F02M 35/0245; F02M 35/16; H05B 1/0236
   See application file for complete search history.

(56) References Cited

U.S. PATENT DOCUMENTS

| | | | |
|---|---|---|---|
| 4,707,167 A | | 11/1987 | Saito et al. |
| 4,760,978 A | * | 8/1988 | Schuyler ................ B64D 15/12 244/134 D |
| 5,540,761 A | * | 7/1996 | Yamamoto ............. B03C 3/155 96/67 |
| 2005/0109204 A1 | * | 5/2005 | Coppom .................. B03C 3/09 95/15 |
| 2005/0252177 A1 | | 11/2005 | Ishikawa |
| 2008/0110454 A1 | * | 5/2008 | White .................. A61M 11/001 128/200.23 |
| 2009/0139200 A1 | * | 6/2009 | Colaprisco ............. F04D 29/70 60/39.092 |

FOREIGN PATENT DOCUMENTS

| | | |
|---|---|---|
| WO | WO 9817368 | 4/1998 |
| WO | WO 99/28011 | 6/1999 |

\* cited by examiner

VEHICLE PROVIDED, AT THE INTAKE, WITH AN AIR FILTER PROVIDED WITH A HEATING DEVICE

CROSS-REFERENCE TO RELATED PATENT APPLICATIONS

This application is a U.S. National Phase Application under 35 U.S.C. § 371 of International Patent Application No. PCT/IB2017/056541, filed Oct. 20, 2017, which claims the priority of Italian Application No. 102016000105840, filed Oct. 20, 2016, which is incorporated by reference as if expressly set forth in its entirety herein.

FIELD OF THE INVENTION

The present invention relates to a vehicle provided, at the intake, with an air filter provided with a heating device.

The present invention can advantageously be applied to an aircraft (i.e., a man-made machine that is able to fly by gaining support from the air to transport persons or objects within the Earth's atmosphere) and in particular to a helicopter, to which the following disclosure explicitly refers without any loss of generality.

PRIOR ART

Modern helicopters are usually provided with at least one turbine engine that drives a rotor blade system which allows said helicopter to take off and land vertically, to hover and to fly laterally, backwards and forwards. The turbine engine has an air intake at the front, through which the turbine engine takes in the external air needed for it to operate (i.e., the external air containing the oxygen needed for combustion).

Generally speaking, the air intake may comprise a metal grid with a relatively large mesh size (in the region of one or two centimetres) the purpose of which is to prevent birds from getting in. Between the air intake and the turbine engine there may be an air filter with the function of filtering the air that is taken in, so as to hold back small impurities (dust and the like) which could, in the long term, lead to premature wear of the turbine engine.

The air filter can only be used when the ambient temperature is (adequately) above zero (on the ground and in the air), because the filtering material is usually hygroscopic and so tends to absorb moisture from the air: when the temperature falls to below zero the moisture in the filtering material freezes to form ice that creates a (more or less extensive) barrier through which the air is unable to enter (but the same problem would also arise with a non-hygroscopic filtering material owing to the surface moisture that forms on the outside surfaces of the filtering material or owing to the snow that could settle on the outside surface of the filtering material). As a consequence, when the ambient temperature is close to or below zero the air filter cannot be used (in particular it is bypassed by opening one or more bypass ducts arranged parallel to the air filter). Alternatively, it has been proposed to fit the air filter with a heating device that is designed to keep the melting temperature of the filtering material at a temperature (adequately) above zero; however, the known heating devices are rather bulky and heavy (a very unfavourable defect in an aircraft) in that they direct the jets of hot air generated by a compressor towards the air filter.

Patent application WO9928011A1 describes a filtering device for the cooling circuit of an electric traction motor of a locomotive; the filtering device comprises a multi-stage air filter through which the cooling air flows, at least one electric heating device for heating the air filter, and a sensor that measures the cooling air flow rate in order to control the switching on or switching off of the electric heating device on the basis of the cooling air flow rate.

Patent application FR2594352A1 describes an air filter for the air taken in by an internal combustion engine of a vehicle; the air filter is provided with an electric heating device which makes an electric current flow through conductors sunk in a panel of corrugated filtering material.

Patent application DE102007047403A1 describes an air filter that is installed in an air conditioning system to filter the air entering the passenger compartment of a vehicle; the air filter is provided with an electric heating device designed to heat the air filter to reduce the level of moisture in the air.

Patent application US2005109204A describes a filtering device for purifying the air entering a closed environment; the filtering device comprises a filtering panel made of fibrous material and a conductive electrode that is sunk in the filtering panel and is coupled to an electric potential in order to neutralize the electric charges that accumulate in the fibrous material and so maintain the high filtering efficiency of said fibrous material.

Patent application WO9817368 describes an air filter used in air-conditioning systems; the air filter consists of a panel of corrugated filtering material that is enclosed between two outer metal grills.

DESCRIPTION OF THE INVENTION

The purpose of the present invention is to propose a vehicle provided, at the intake, with an air filter provided with a heating device, said vehicle overcoming the drawbacks described above and, at the same time, being easy and inexpensive to produce.

According to the present invention there is provided a vehicle equipped, at the intake, with an air filter provided with a heating device, as claimed in the appended claims.

BRIEF DESCRIPTION OF DRAWINGS

The present invention will now be described with reference to the accompanying drawings, which illustrate a non-limiting embodiment thereof, in which:

FIG. 2 is a schematic cross-sectional view of an air box provided with an air filter and through which the air needed to operate a turbine engine of the helicopter shown in FIG. 1 is taken in;

PREFERRED EMBODIMENTS OF THE INVENTION

Figure 1:
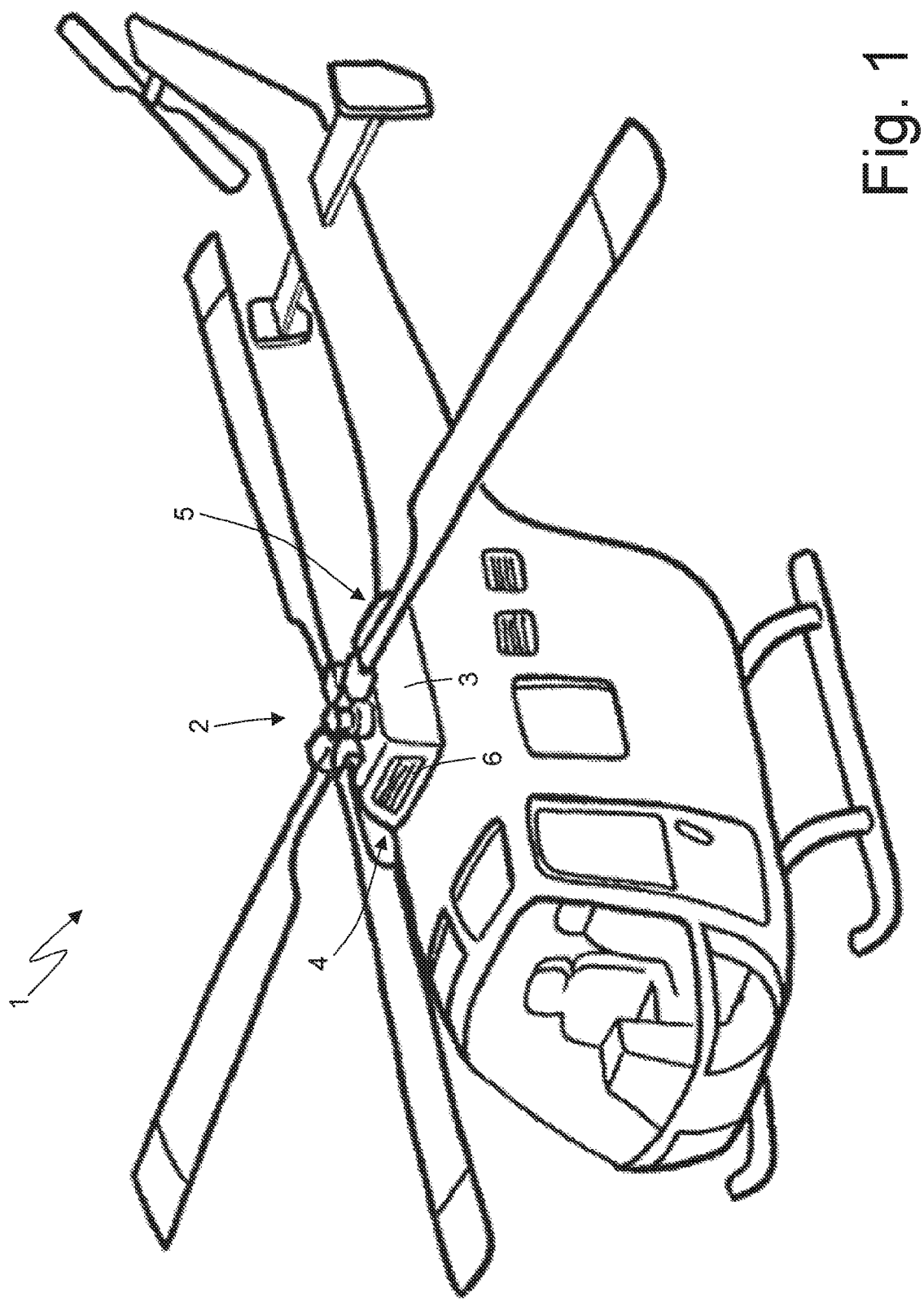
FIG. 1 is a perspective schematic view of a helicopter built according to the present invention.

In FIG. 1 denoted as a whole by reference numeral 1 is a helicopter comprising a turbine engine 2 that drives a rotor blade system which enables said helicopter to take off and land vertically, to hover and to fly laterally, backwards and forwards.

The turbine engine 2 comprises a tubular housing 3 having, at the front, an air intake 4 (through which the turbine engine 2 takes in the external air needed for it to operate, i.e., the external air containing the oxygen needed for combustion) and, at the back, an air outlet 5 (through which the turbine engine 2 expels the exhaust gas produced by the combustion process). In the area of the air intake 4 there is a metal grid 6 with a relatively large mesh size (in the region of one or two centimetres) the function of which is to prevent birds from getting in.

Figure 2:
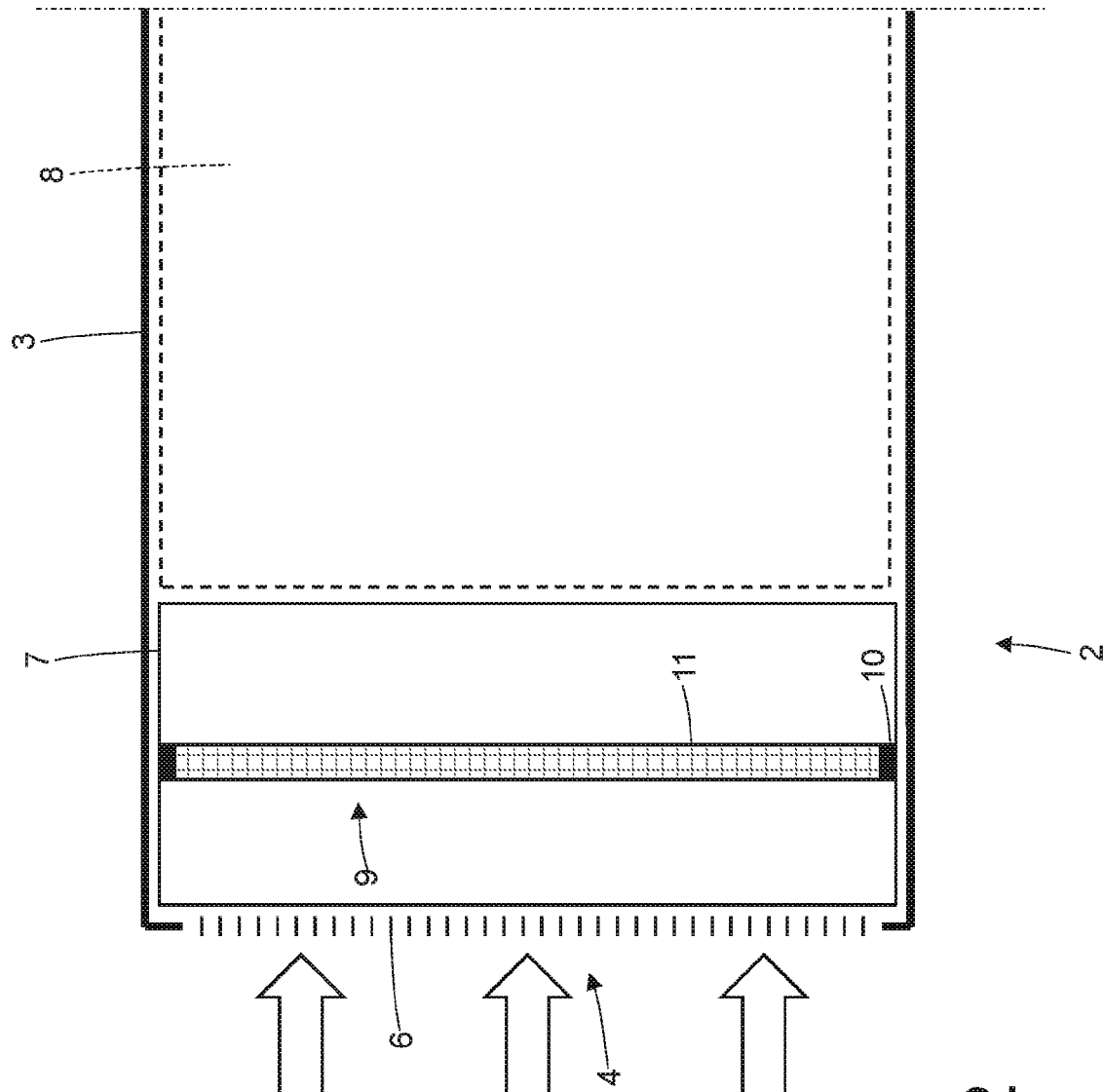
Figure 3:
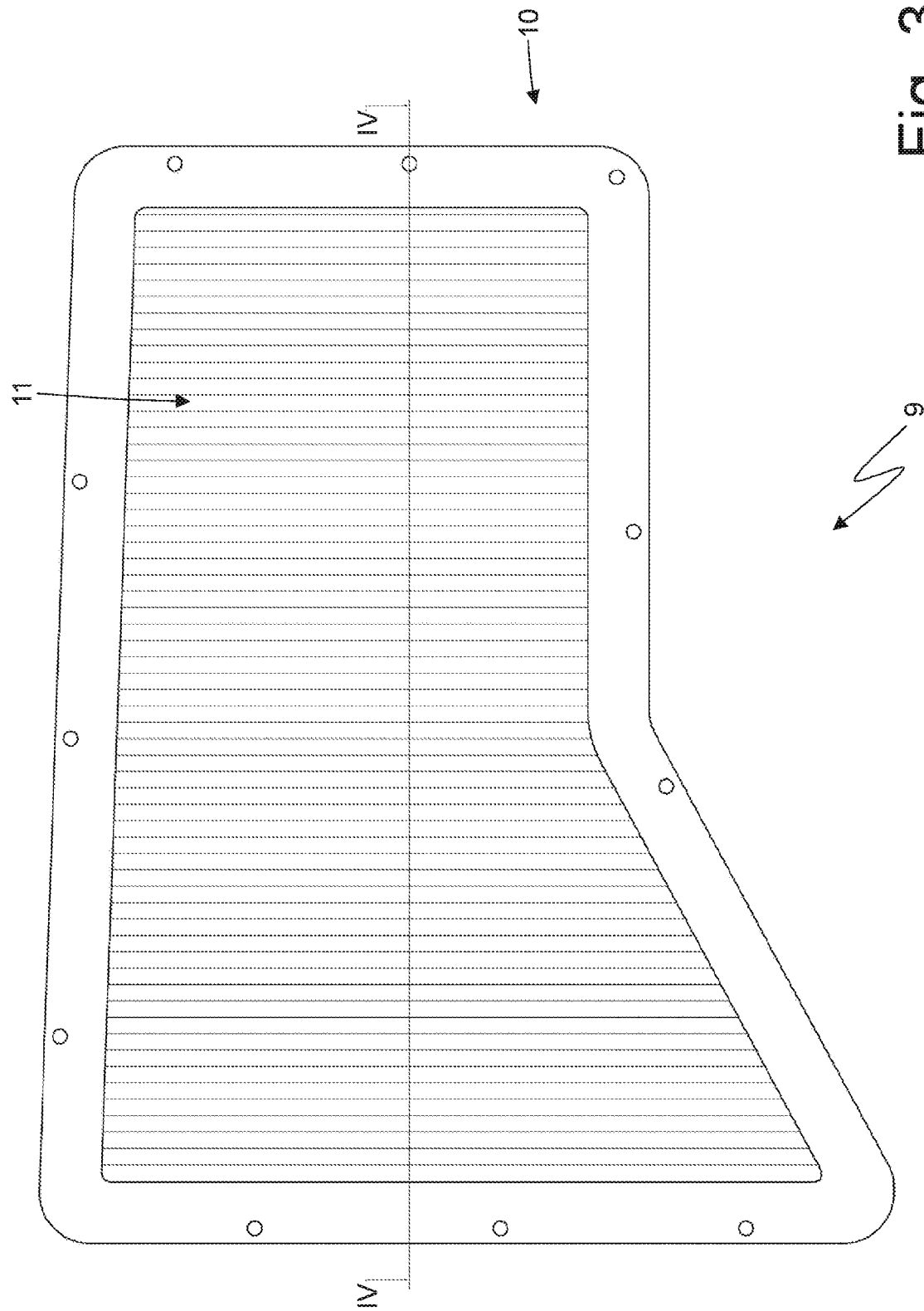
FIG. 3 is a plan view of the air filter shown in FIG. 2.

As illustrated in FIG. 2, in the tubular housing 3 there is an air box 7 which has, on the inside, a cavity with an inlet opening coupled to the air intake 4 of the tubular housing 3 and an outlet opening coupled to an intake system 8 of the turbine engine 2 (fresh air is conveyed through the intake system 8 towards the moving parts of the turbine engine 2 in which fuel combustion takes place using the air taken in as the comburent air i.e., towards the combustion chamber of the turbine engine 2). Inside the cavity of the air box 7 there is an air filter 9 which is interposed between the inlet opening and the outlet opening and thus divides the cavity into an intake chamber, which is arranged upstream of the air filter 9 and communicates with the external environment, and an outlet chamber, which is arranged downstream of the air filter 9 and communicates with the intake system of the turbine engine 2. The air filter 9 is arranged downstream of the air intake 4 and has the function of filtering the intake air in order to withhold small impurities (dust and the like) which could, in the long term, lead to premature wear of the turbine engine 2.

The air filter 9 comprises a peripheral frame 10 (made of aluminium, of plastic material or of a composite material) that supports a panel 11 of filtering material (for example consisting of a woven or non-woven fabric made of cotton or other fibres enclosed between two layers of a thin metal net which give shape and strength to said filtering material). It is important to observe that the shape of the air filter 9 as seen in a plan view may vary (for example round, rectangular, elliptical, triangular, trapezoidal or a combination of these) depending on the shape of the tubular housing 2, i.e., depending on the shape of the air box 7 in which the air filter 9 is housed.

According to that illustrated in FIGS. 3-6, the air filter 9 comprises the peripheral frame 10 (made of aluminium, of a plastic material or of a composite material) which supports the panel 11 of wave-shaped filtering material (i.e., with a wave-shaped configuration to increase the useful surface of filtering material without increasing the external dimensions) which consists for example of a woven or non-woven fabric made of cotton or other fibres. The air filter 9 comprises a thin pleated outer reinforcement mesh 12 and a thin pleated inner reinforcement mesh 13 which rest against opposite surfaces of the filtering material panel 11 (i.e., enclosing the filtering material panel 11 between them) to give said filtering material panel 11 a stable shape and strength. In other words, the filtering material panel 11 is covered on both sides by the reinforcement meshes 12 and 13 (i.e., it is contained between the reinforcement meshes 12 and 13) which give said filtering material panel 11 a stable shape. It is important to observe that the reinforcement meshes 12 and 13 are dimensioned both to give the panel 11 the required shape stability in order to withstand the air pressure without becoming deformed, even when the helicopter 1 travels at high speed with a strong headwind, and so that it does not constitute too big an obstacle to the air flow (i.e., so as not to produce an excessive loss of load in the intake air flowing through the air filter 9).

The outer reinforcement mesh 12 rests against an outer surface of the filtering material panel 11 through which the intake air enters to pass through said filtering material panel 11; the inner reinforcement mesh 13, instead, rests against an inner surface of the filtering material panel 11 which is opposite the outer surface. In other words, the outer reinforcement mesh 12 is arranged upstream of the filtering material panel 11 with respect to the intake air flow, whereas the inner reinforcement mesh 13 is arranged downstream of the filtering material panel 11 with respect to the intake air flow.

Figure 6:
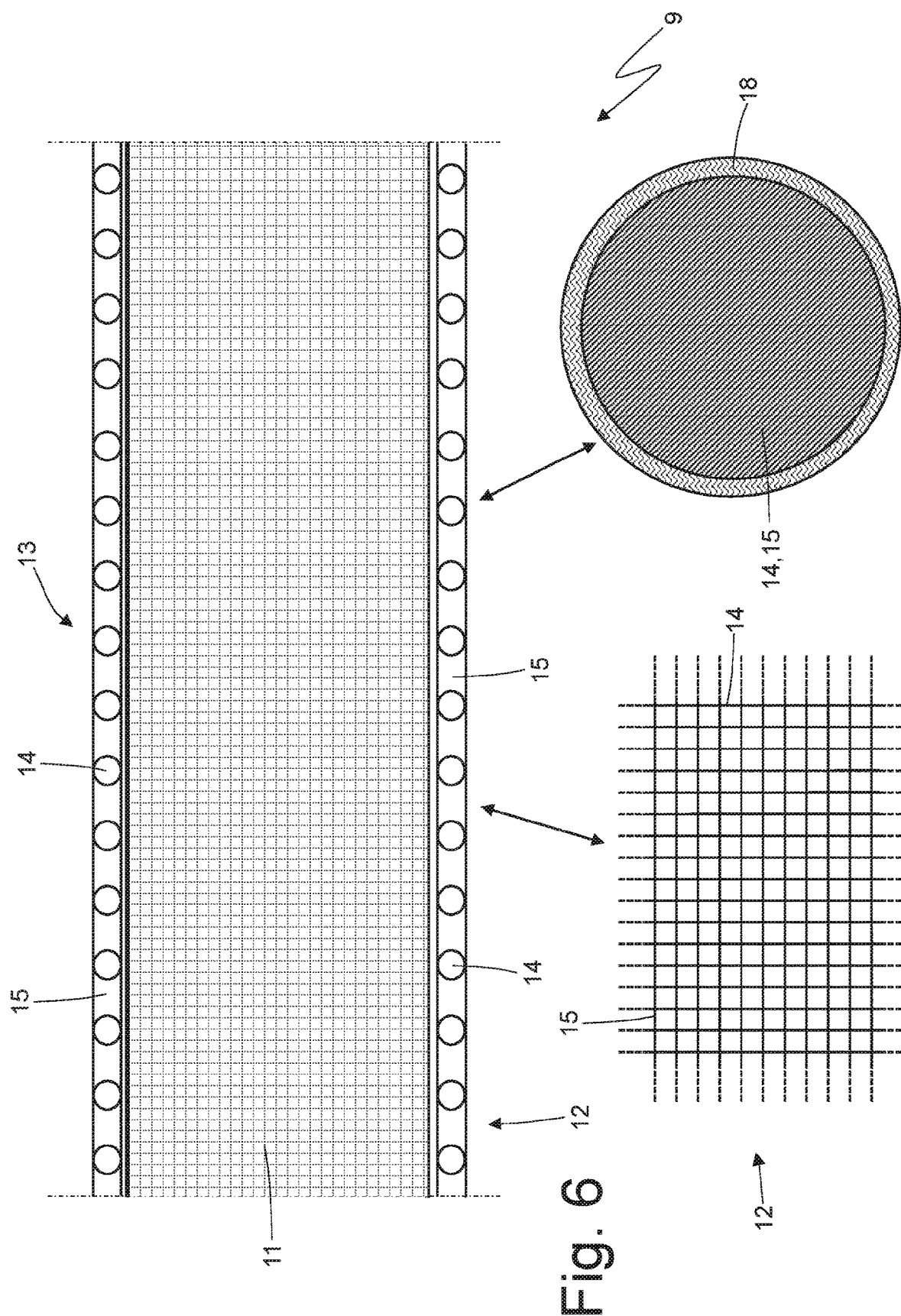
FIG. 6 is an enlarged scale view of a detail of FIGS. 4 and 5.

According to that illustrated in FIG. 6, both of the reinforcement meshes 12 and 13 are made up of a plurality of warp wires 14 (i.e., which make up the warp) and a plurality of weft wires 15 (i.e., which make up the weft); the warp wires 14 extend in a linear direction, whereas the weft wires 15 are fed through the shed of the warp wires 14 by "winding" them around said warp wires 14. In other words, the weft wires 15 are interlaced with the warp wires 14 in such a way that the reinforcement meshes 12 and 13 are obtained by means of a weaving process (i.e., by interlacing the warp wires 14 with the weft wires 15). It is important to observe that the reinforcement meshes 12 and 13 have no welding spots (i.e., the wires 14 and 15 are not welded to each other) and are held together through the interlacing of the warp wires 14 with the weft wires 15 (i.e., they are held together by weaving the warp wires 14 with the weft wires 15). According to a possible embodiment, once the reinforcement meshes 12 and 13 have been formed the reinforcement meshes 12 and 13 can be provided with a further coating made of enamel or paint which also has the function of joining the wires 14 and 15 to one another (i.e., the further coating made of enamel or paint is applied to the reinforcement meshes 12 and 13 after the weaving of said reinforcement meshes 12 and 13); in other words, the enamel or paint coating that covers the reinforcement meshes 12 and/or 13 establishes a mechanical coupling between the weft wires 14 and the warp wires 15 and thus contributes to holding the reinforcement mesh 12 and/or 13 together in the correct position. Clearly, the enamel or paint coating that covers the reinforcement mesh 12 and/or 13 also provides an additional protection for the wires 14 and 15. By way of example, the enamel or paint coating could be applied by dipping the reinforcement mesh 12 and/or 13 in an enamel or paint bath.

To manufacture the air filter 9, the reinforcement meshes 12 and 13 and the filtering material panel 11 are manufactured separately as flat pieces, then the reinforcement meshes 12 and 13 are placed on opposite surfaces of the filtering material panel 11 to form a unit (i.e., a "sandwich") which is also flat and is then bent in a wave shape to give said unit its final shape; lastly, said wave-shaped unit is coupled to the peripheral frame 10 (usually by means of glue and/or resin) which, in addition to giving the air filter 9 a stable shape, also has the function of holding together the unit formed by the reinforcement meshes 12 and 13 and the filtering material panel 11.

Figure 4:
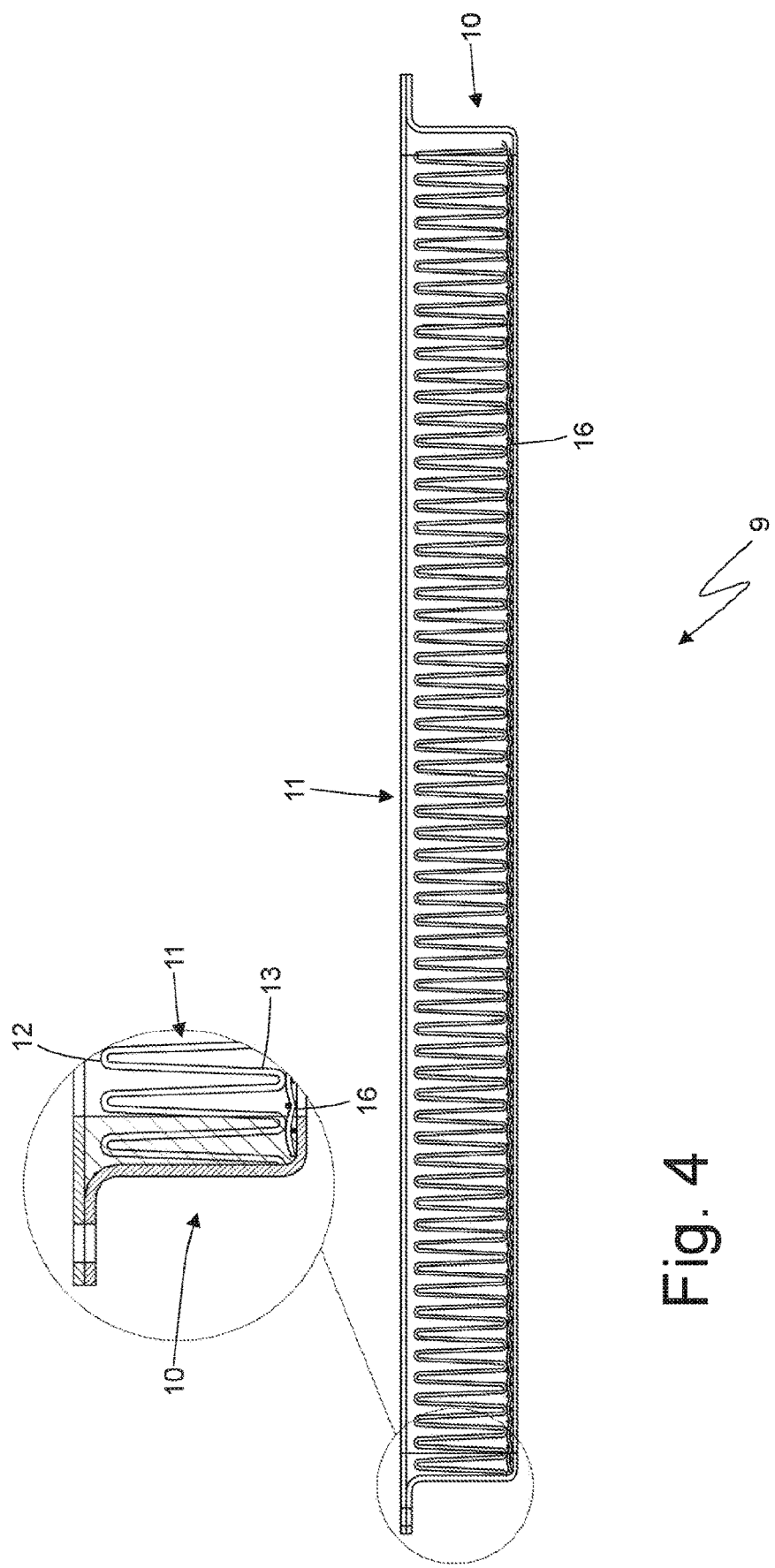
FIG. 4 is a cross-sectional view along the line IV-IV of the air filter shown in FIG. 2.
Figure 5:
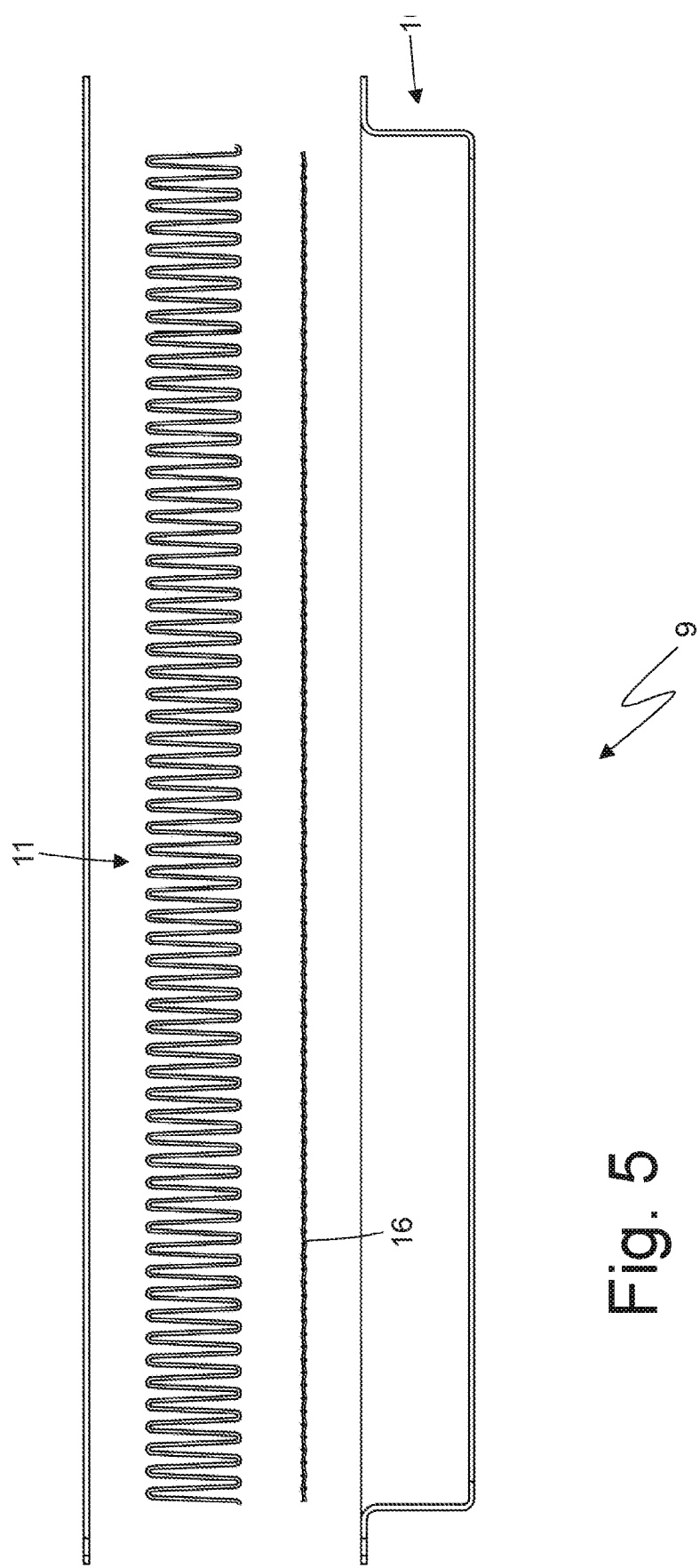
FIG. 5 is an exploded cross-sectional view along the line IV-IV of the air filter shown in FIG. 2.

According to a possible (but by no means mandatory) embodiment illustrated in FIGS. 4 and 5, the air filter 9 further comprises a plane (flat) stiffening mesh 16 which is arranged internally and has the function of helping the wave-shaped filtering material panel 11 to withstand the stress caused by the pressure generated by the intake air, without being deformed; the function of the reinforcement stiffening mesh 16 is more important in the case of air filters 9 with a large surface.

Figure 7:
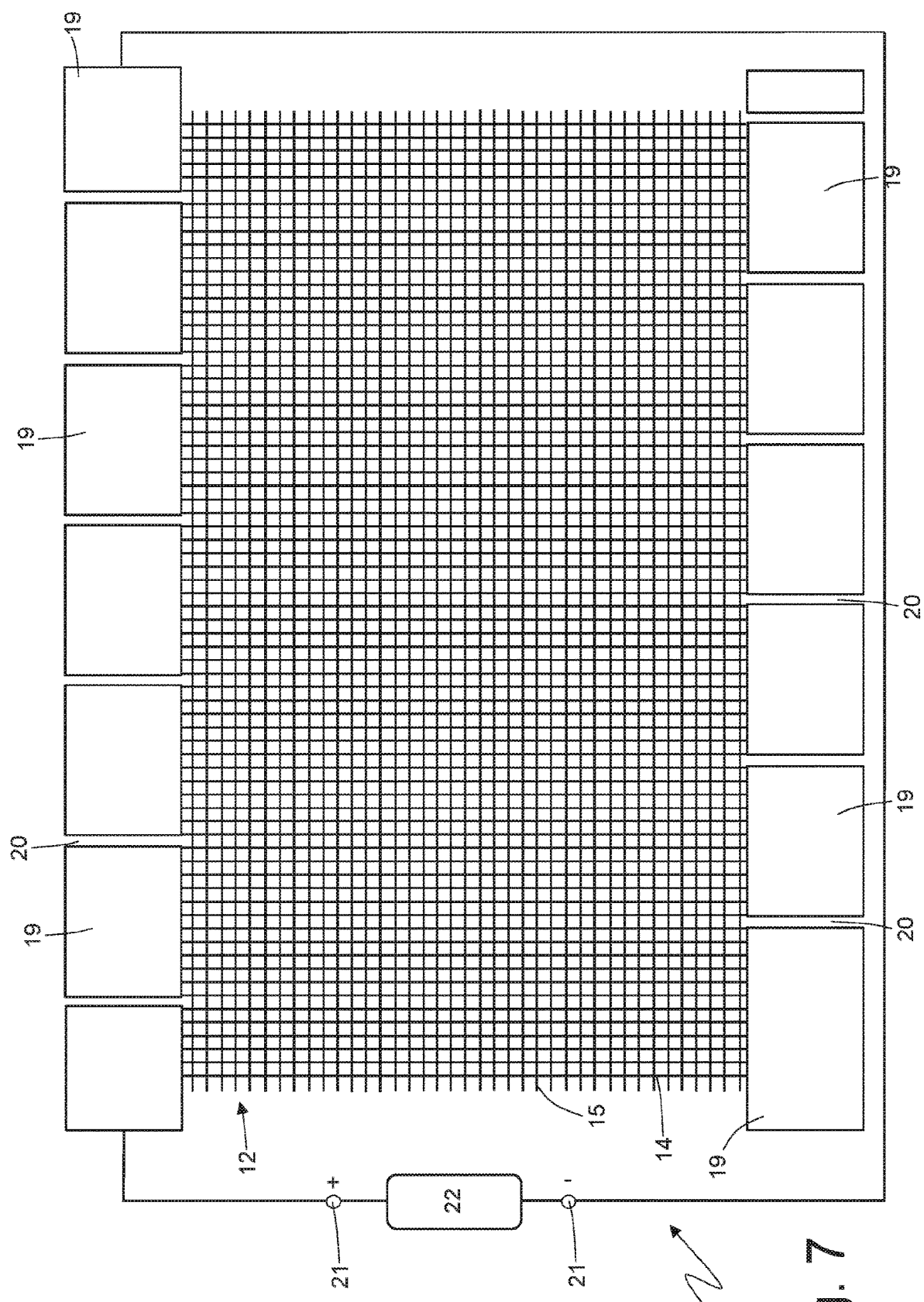
FIGS. 7 and 8 are schematic views of the electrical connections of an outer reinforcement mesh of the air filter shown in FIG. 2.
Figure 8:
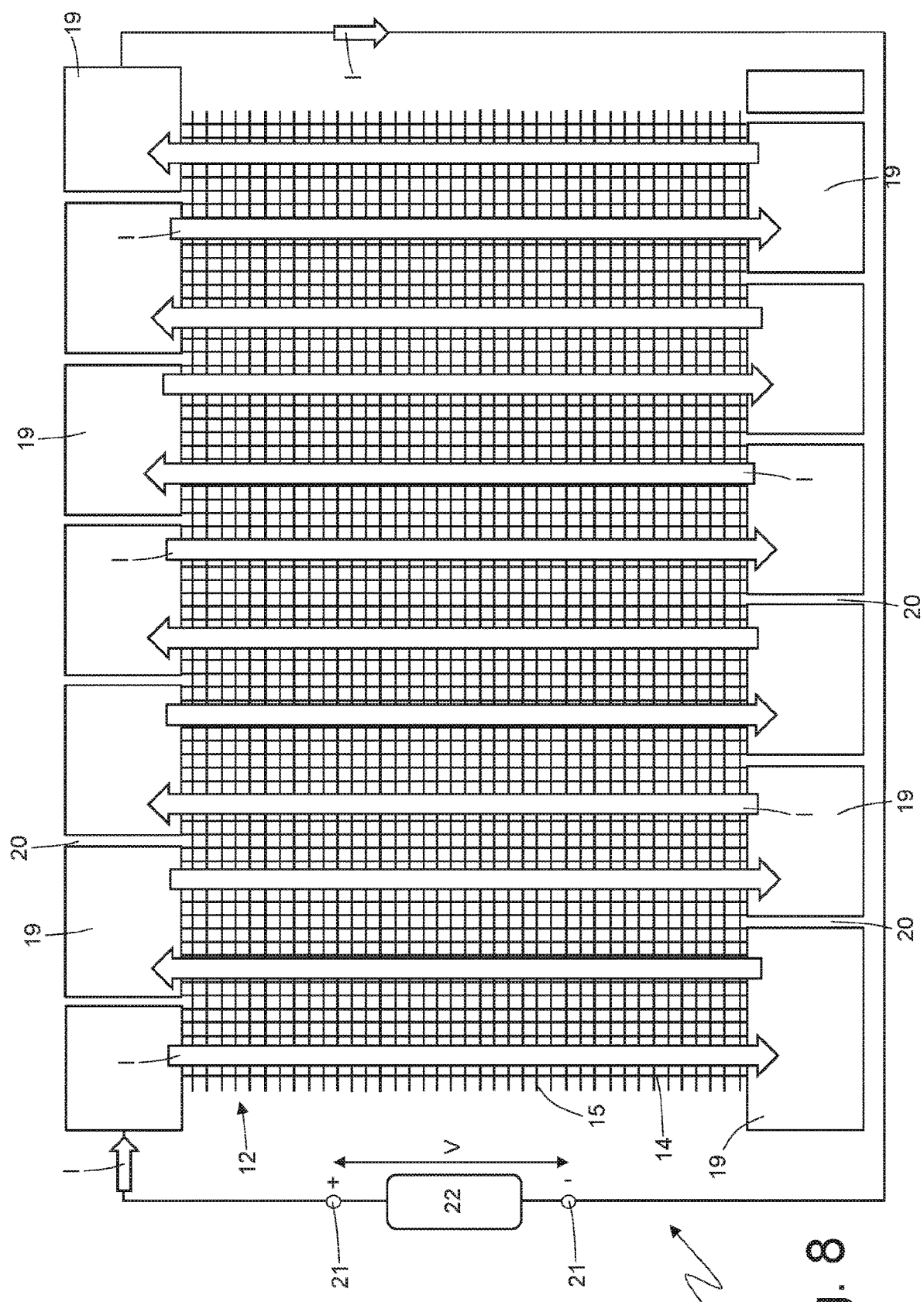

According to that illustrated in FIGS. 7 and 8, the air filter 9 comprises a heating device 17 which is designed to heat the filtering material panel 11 (when necessary). In particular, the heating device 17 is designed to cause an electric current I to flow through part of the outer reinforcement mesh 12 so as to generate heat by the Joule effect on the inside of said outer reinforcement mesh 12. The heat generated by the outer reinforcement mesh 12 is transmitted to the filtering material panel 11 both directly by heat conduction (in that the outer reinforcement mesh 12 rests against an outer surface of the filtering material panel 11), and indirectly by means of the intake air which warms up as it flows through the outer reinforcement mesh 12 and then releases heat to the filtering material panel 11 when it flows through said filtering material panel 11.

According to a preferred embodiment illustrated in FIG. 6, each warp wire 14 and each weft wire 15 is provided with an outer insulation 18 made of a material that is electrically insulating and, insofar as possible, heat conducting; according to a preferred embodiment, the outer insulation 18 is made of enamel or paint with a thickness of between 0.0005 mm and 0.08 mm.

According to a preferred embodiment illustrated in FIGS. 7 and 8, the heating device 17 causes the electric current I to circulate through a limited number of the wires 14 and 15 that make up the outer reinforcement mesh 12, i.e., only a limited number of the wires 14 and/or 15 that make up the outer reinforcement mesh 12 are electrified (i.e., electrically connected to an electric voltage generator) in that the electric current I flows through them. Normally, it suffices to only apply the outer insulation 18 to the wires 14 and/or 15 that are to be electrified (i.e., through which the electric current I flows) and therefore to leave the wires 14 and/or 15 that are not electrified (i.e., through which the electric current I does not flow) without the outer insulation 18. Nonetheless, according to a preferred (but not binding) embodiment, all the wires 14 and 15 are provided with the outer insulation 18 regardless of whether or not they are electrified in order to prevent a non-electrified wire 14 and/or 15 from causing a short circuit between electrified wires 14 and/or 15 if the outer insulation 18 on said electrified wires 14 and/or 15 is damaged.

As mentioned previously, the outer reinforcement mesh 12 is made up of a plurality of warp wires 14 (i.e., which make up the warp) and a plurality of weft wires 15 (i.e., which make up the weft); the warp wires 14 extend in a linear direction, whereas the weft wires 15 are fed through the shed of the warp wires 14 (i.e., they are interlaced with the warp wires 14) by "winding" them around said warp wires 14. According to a preferred (but non-limiting) embodiment, the heating device 17 is designed to cause the electric current I to circulate through a group of electrified wires which are normally only the warp wires 14 or only the weft wires 15; in other words, the heating device 17 is only electrically connected to the warp wires 14 or to the weft wires 15; however, according to an alternative embodiment, the heating device 17 is electrically connected to both the warp wires 14 and to the weft wires 15 to cause the electric current I to circulate through warp wires 14 and weft wires 15. Preferably (but not necessarily), the electrified wires are only the warp wires 14, in that the warp wires 14 extend in a more linear manner and the outer insulation 18 is thus subject to less mechanical stress (therefore the outer insulation 18 is less likely to break locally owing to the bends). According to a preferred (but not mandatory) embodiment illustrated in FIGS. 7 and 8, all the warp wires 14 are electrified, i.e., the electric current I flows through them all.

According to that illustrated in FIGS. 7 and 8, the heating device 17 comprises a plurality of collectors 19 (i.e., of rectangular plates designed to electrically connect corresponding warp wires 14), each of which is electrically connected to the ends of a group of warp wires 14 so as to connect said warp wires 14 to one another and is electrically insulated (in particular physically separated) from the adjacent collectors 19; in other words, between one collector 19 and the adjacent collectors 19 there is an empty space 20 (a break, a hole, a separation) which determines an electric insulation (i.e., two adjacent collectors 19 do not touch one another owing to the empty space 20 between them and are thus electrically insulated from one another). The collectors 19 determine a parallel/series connection of the warp wires 14 (as better illustrated in FIG. 8): the warp wires 14 are divided into a plurality of groups of warp wires 14, within the same group of warp wires 14 all the warp wires 14 are connected to one another in parallel (thanks to two opposite collectors 19), and the different groups of warp wires 14 are connected to one another in series (thanks to the fact that each collector 19 extends to the warp wires 14 of two adjacent groups, except for the initial collector 19 and the final collector 19). All the groups of warp wires 14 are made up of the same number of warp wires 14, which can generally range from five to fifty.

In other words, each collector 19 is merely a rectangular plate of conductive metal material (for example copper or alternatively aluminium) which electrically connects corresponding warp wires 14 (in the case in which the warp wires 14 are electrified).

A power supply device 22 is connected to the ends 21 of the electric circuit formed by the warp wires 14 connected in parallel/series by the collectors 19 in order to apply a potential difference V which determines the circulation of the electric current I. Generally speaking, the power supply device 22 receives electric energy from an electric power bus of the helicopter 1 and is able to control the value of the potential difference V applied at the ends 21 of the electric circuit and thus to control the strength of the electric current I and thus the heat generated in the electrified wires 14 due to the Joule effect (it is important to observe that the potential difference V applied at the ends 21 of the electric circuit may be reduced in intensity and/or in time). Normally, the electric power bus of the helicopter 1 supplies alternating electric voltage at 110 Volts. It is important to observe that the power supply device 22 could also be an ordinary switch (electronically controlled) that is closed to connect the ends 21 of the electric circuit to the electric power bus of the helicopter 1.

The method of connecting the warp wires 14 in parallel/series has two advantages. First, the method for connecting the warp wires 14 in parallel/series makes it possible to obtain an overall electrical resistance at the ends 21 of the electric circuit consisting of the warp wires 14 with a value that is ideal in order to obtain the necessary heating power without the need for an electric current I that is too strong. Furthermore, the method for connecting the warp wires 14 in parallel/series makes it possible to obtain a "robust" electric circuit capable of operating properly even in the case of breakage (interruption) of some of the warp wires 14.

As mentioned previously, the wires 14 and 15 are provided with an outer insulation 18 made of an electrically insulating and preferably heat conductive material to prevent the warp wires 14 from being electrically connected to one another by the weft wires 15 with a subsequent reduction (which could even be very significant) of the overall electrical resistance.

According to a preferred (but not mandatory) embodiment, the warp wires 14 that are electrified (i.e., those through which the electric current I flows) are made of a first material that is different from a second material used to make the non-electrified weft wires 15 (i.e., those through which the electric current I does not flow) and has a higher resistivity than the second material. For example, the electrified warp wires 14 may be made of constantan (a binary alloy made of 60% copper and 40% nickel) which, at room temperature, has a resistivity of approximately $4.9 \times 10^{-7}$ $\Omega/m$ or they may be made of nickel-chrome (a binary alloy containing 80% nickel and 20% chrome) which, at room temperature, has a resistivity of approximately $108 \times 10^{-7}$ $\Omega/m$; the non-electrified weft wires 15, on the other hand, may be made of steel which, at room temperature, has a resistivity of approximately $1.1$-$1.8 \times 10^{-7}$ $\Omega/m$ or of aluminium which, at room temperature, has a resistivity of approximately $2.8 \times 10^{-7}$ $\Omega/m$ or of copper which, at room temperature, has a resistivity of approximately $1.68 \times 10^{-7}$ $\Omega/m$.

The use of a material with a relatively high resistivity for the electrified warp wires 14 makes it possible to obtain an overall electrical resistance at the ends 21 of the electric circuit formed by the warp wires 14 with a value that is ideal for obtaining the necessary heating power without the need for an electric current I that is too high.

Furthermore, the use of a material in which the resistivity varies little when the temperature changes (as in the case of constantan) for the electrified warp wires 14 prevents localised differences in the temperature of the warp wires 14 from determining significant localised differences in the electrical resistance and thus from significantly altering the circulation of the electric current I.

It is important to observe that the overall electrical resistance at the ends 21 of the electric circuit formed by the warp wires 14 must be relatively high (in the region of tens of Ohms) to prevent the voltage difference V applied by the power supply device 22 from being too small and, thus, the electric current I from being too high. Devices 17 capable of generating with good accuracy a potential difference V in the region of a few tens or a few hundreds of Volts while supplying electric currents I that are not too high (in the region of several tens of Amperes at the most) are, in fact, available on the market; heating devices 17 capable of generating a potential difference V in the region of only a few Volts while delivering very high electric currents I (even hundreds of Amperes) are, instead, hard to find (and thus expensive). It is therefore important to make sure that the overall electrical resistance at the ends 21 of the electric circuit formed by the warp wires 14 is high enough to enable the use of a heating device 17 that is readily available on the market; this result is achieved by choosing a material with high electrical resistivity for the electrified warp wires 14 and by choosing the type of connection of the warp wires 14 to the heating device 17; the dimensions (length and section) of the electrified warp wires 14 are, instead, substantially dictated by the size of the air filter 9 and by the mechanical/pneumatic dimensioning (i.e., by the need to achieve the necessary mechanical strength without excessively penalising the intake air flow).

Furthermore, the overall electrical resistance at the ends 21 of the electric circuit formed by the warp wires 14 must be relatively high (in the region of tens of Ohms) to prevent the intensity of the electric current I from being too high, as a high intensity electric current I requires the use of cables and connection terminals with a large cross-section and which are thus heavy and bulky.

If the available electric power supply is a single-phase system, a single electric circuit is usually (but not necessarily) obtained in the warp wires 14 throughout the entire outer reinforcement mesh 12. If the electric power supply is a three-phase system (as is normally the case with commercial helicopters), three separate electric circuits (i.e., electrically insulated from one another) are formed in the warp wires 14 and may be in connected in a star configuration (in which case the resistance of each single electric circuit is for example approximately 20 Ohms) or they may be connected in a delta configuration (in which case the resistance of each single electric circuit is for example approximately 50 Ohms).

According to a preferred embodiment, the heating device 17 performs feedback control of the potential difference V applied by the power supply device 22 (i.e., the electric current I that flows through the electrified warp wires 14) using the actual temperature of the filtering material panel 11 as the feedback variable and so as to follow a desired temperature of the material panel 11. To perform said feedback control the heating device 17 must determine the actual temperature of the filtering material panel 11 in real-time; according to a possible embodiment, a temperature sensor is coupled to the filtering material panel 11 and may be sunk in the filtering material panel 11 or may rest on the outer or inner surface of the filtering material panel 11. Alternatively, the heating device 17 estimates the actual temperature of the filtering material panel 11 on the basis of the actual temperature of the electrified warp wires 14, i.e., the heating device 17 determines the actual temperature of the electrified warp wires 14 and estimates the actual temperature of the filtering material panel 11 on the basis of the actual temperature of the electrified warp wires 14; for example, the heating device 17 determines the actual electrical resistance of the electrified warp wires 14 through which the electric current I flows and determines the actual temperature of the electrified warp wires 14 on the basis of the actual electrical resistance of the electrified warp wires 14 (using the known existing relationship between the electrical resistivity of a conductor and the corresponding temperature).

The heating device 17 may be activated automatically on the basis of the actual temperature of the filtering material panel 11 or manually by the pilot of the helicopter 1.

According to a preferred embodiment, the heating device 17 (which also comprises, on the inside, all the related control electronics, and thus also the power supply device 22) is integrally fixed to the peripheral frame 6 in such a way that the air filter 9 and the heating device 17 form a single compact unit that can be assembled/disassembled quickly.

Figure 9:
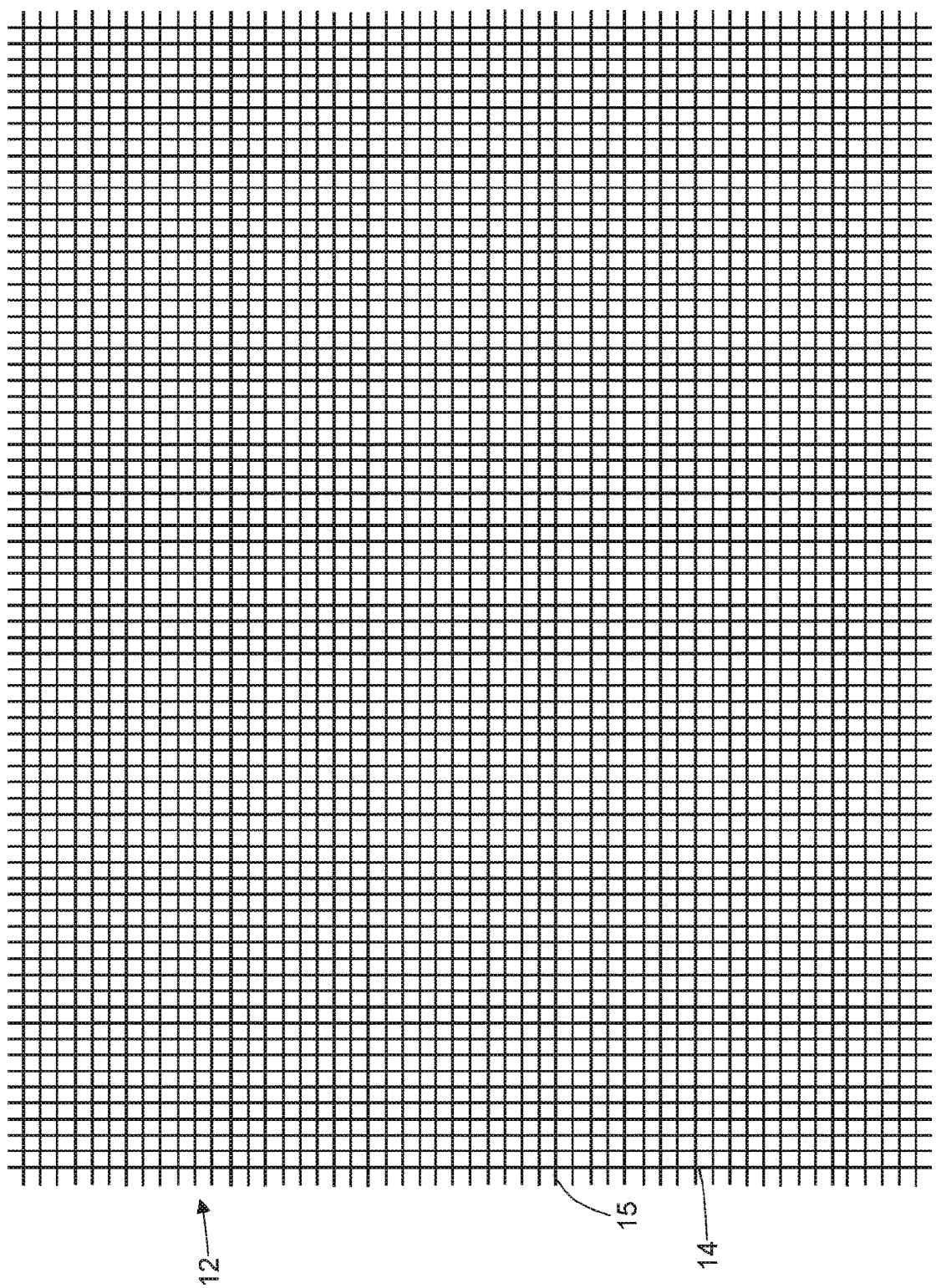
FIGS. 9, 10 and 11 are schematic views of the methods for implementing the electrical connections of the outer reinforcement mesh of the air filter shown in FIG. 2.
Figure 10:
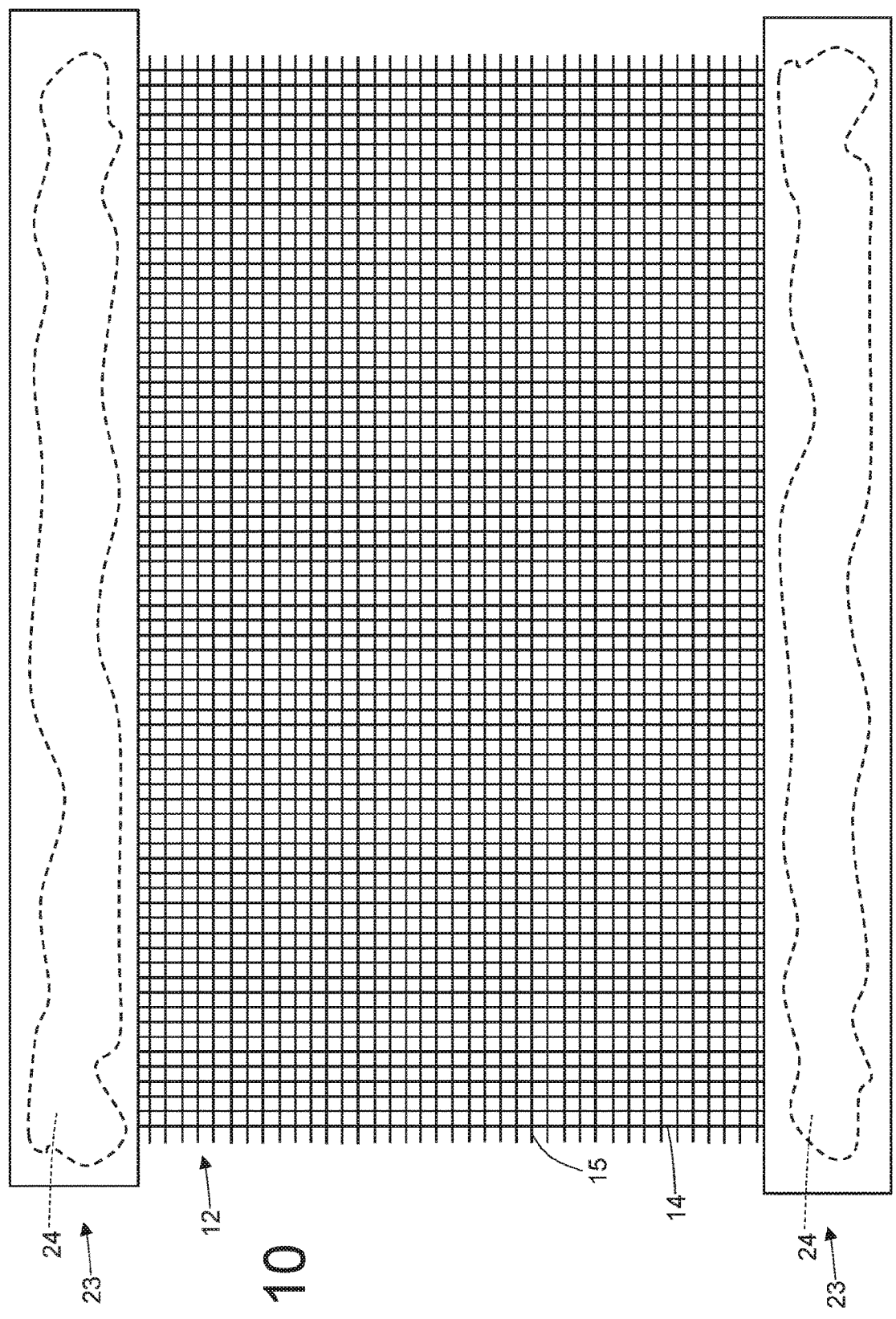
Figure 11:
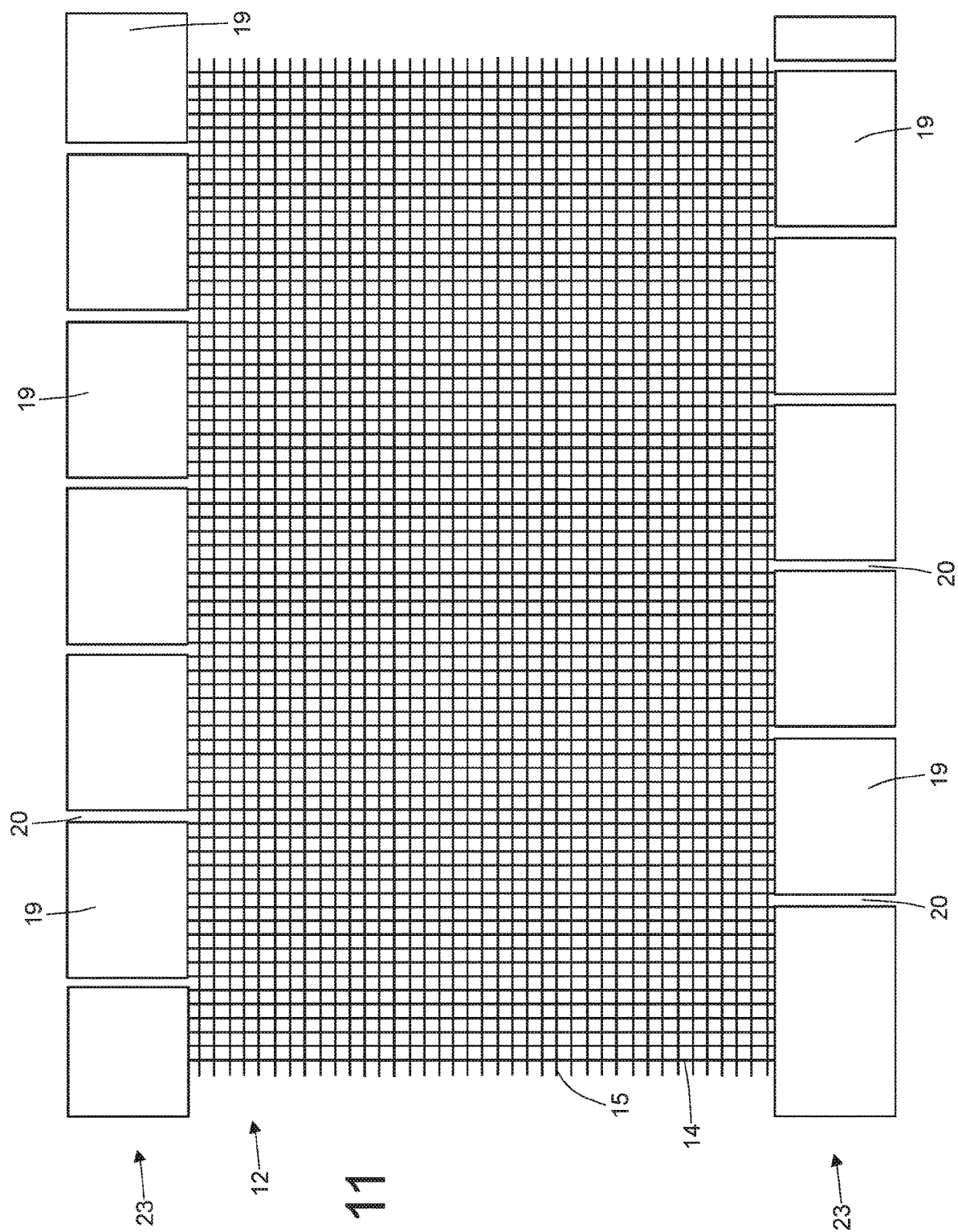

With reference to FIGS. 9, 10 and 11, a particularly effective and efficient method for manufacturing the electrified outer reinforcement mesh 12, i.e., with the warp wires 14 electrically connected to the power supply device 22 so that, when necessary, the electric current I can flow through them, will now be disclosed.

First, as illustrated in FIG. 9, the outer reinforcement mesh 12 is manufactured by interlacing the warp wires 14 (made for example of constantan and externally provided with the outer insulation 18) with the weft wires 15 (made for example of aluminium and externally provided with the outer insulation 18). Clearly, the wires 14 and 15 are provided with the outer insulation 18 before being interlaced and using entirely conventional processes (with a low production cost since these are widely used in the sector of electrical windings).

Next, and as illustrated in FIG. 10, two strips 23 of conductive metal material (such as aluminium or copper) are placed at the opposite ends of the outer reinforcement mesh 12 and in the area of the ends of the warp wires 14 and are welded to the ends of the warp wires 14 using weld material; in particular, welding is performed using a low-melting weld material 24 (typically tin or a tin alloy) which is interposed between the ends of the warp wires 14 and the strips 23. The weld material 24 is mixed with flux and the melting temperature of the weld material 24 is higher than the melting temperature of the outer insulation 18; as a consequence, the melted weld material 24 locally melts the outer insulation 18 (the melted outer insulation 18 is discharged by the flux mixed with the weld material 24) to bare the ends of the warp wires 14 and making it possible to obtain a high quality electrical connection between the ends of the warp wires 14 and the strips 23. Alternatively, the ends of the warp wires 14 can be bared beforehand by locally removing the outer insulation 18 (for example by means of a thermal, mechanical and/or chemical process) before welding the ends of the warp wires 14 to the strips 23. At this point, the two strips 23 connect all the warp wires 14 to one another in parallel, i.e., they create a parallel connection of all the warp wires 14.

According to a preferred but non-limiting embodiment, continuous strips of weld material 24 are used, each of which is interposed between a strip of conductive metal material 23 and the corresponding ends of the warp wires 14. In other words, for the sake of convenience and simplicity the weld material 24 is in the form of strips (just like the strips of conductive metal material 23) so that the weld material 24 can be applied easily and more quickly.

Preferably, the welding of the strips 23 of conductive metal material to the ends of the warp wires 14 through the interposition of the weld material 24 is performed by placing the outer reinforcement mesh 12 (provided, of course, with the strips 23 and with the weld material 24) in a furnace that reaches a temperature that is higher than the melting temperature of the weld material 24; preferably inside the furnace the outer reinforcement mesh 12 is subjected to a constant and calibrated pressure (at least in the area of the strips 23) to guarantee good welding results between the strips 23 and the ends of the warp wires 14.

Next, and as illustrated in FIG. 10, each strip 23 is cut (for example using a mechanical cutting process) by means of through cuts parallel to the warp wires 14 so as to create the spaces 20 (which are parallel to the warp wires 14) and hence obtain from the strip 23 a succession of collectors 19 that are separate from one another (and thus electrically insulated from one another). This mechanical process is commonplace, economical and can be performed very quickly with a high level of precision.

According to a preferred embodiment, the collectors 19 are applied to the outer reinforcement mesh 12 before applying any further enamel or paint coating to said outer reinforcement mesh 12. Alternatively, the collectors 19 could also be applied to the outer reinforcement mesh 12 after applying any further enamel or paint coating to said outer reinforcement mesh 12.

According to an alternative embodiment illustrated in FIGS. 12 and 13, instead of resting two strips 23 of metal material from which the two successions of electrically insulated collectors 19 are subsequently obtained against the opposite ends of the outer reinforcement mesh 12 and in the area of the ends of the warp wires 14, two successions of collectors 19 electrically insulated from one another can be placed against the opposite ends of the outer reinforcement mesh 12 and in the area of the ends of the warp wires 14 (i.e., the electrical insulation between the collectors 19 is created beforehand in the two strips 23 of metal material).

According to a preferred embodiment, each succession of collectors 19 is borne by a supporting strip 19A made of electrically insulating plastic material and is placed at one end of the outer reinforcement mesh 12 along with the supporting strip 19A. By way of example, each supporting strip 19A could be made of Kapton® (a polyimide film developed by DuPont® and used, among other things, in flexible printed circuits). It is important to observe that when the weld material 24 in the area of the empty spaces 20 (i.e., which only comes into contact with the support strip 19A) is heated to melting point it does not create any connection in the area of the empty spaces 20 but "migrates" spontaneously towards the nearest collectors 19.

Summing up, in the manufacture of the electrified outer reinforcement mesh 12, two successions of collectors 19 are placed on the opposite ends of the outer reinforcement mesh 12 and in the area of the ends of the warp wires 14. Said successions of collectors 19 may have been completed beforehand (i.e., with the empty spaces 20 already formed and so borne by corresponding supporting strips 19A) or they may be completed at a later stage (i.e., the empty spaces 20 may be formed later on). In the embodiments described previously, the warp wires 14 of the outer reinforcement mesh 12 are electrified (i.e., the electric current I can flow through them), they are made of a first metal material, preferably constantan, and are externally coated with an outer insulation 18 made of an electrically insulating material (alternatively, the weft wires 15 could be electrified instead of the warp wires 14). The weft wires 15, instead, are not electrified (i.e., the electric current I cannot flow through them), they are made of a second metal material, preferably steel, aluminium or copper, different from the first metal material, and are also externally coated with an outer insulation 18 made of an electrically insulating material.

Figure 14:
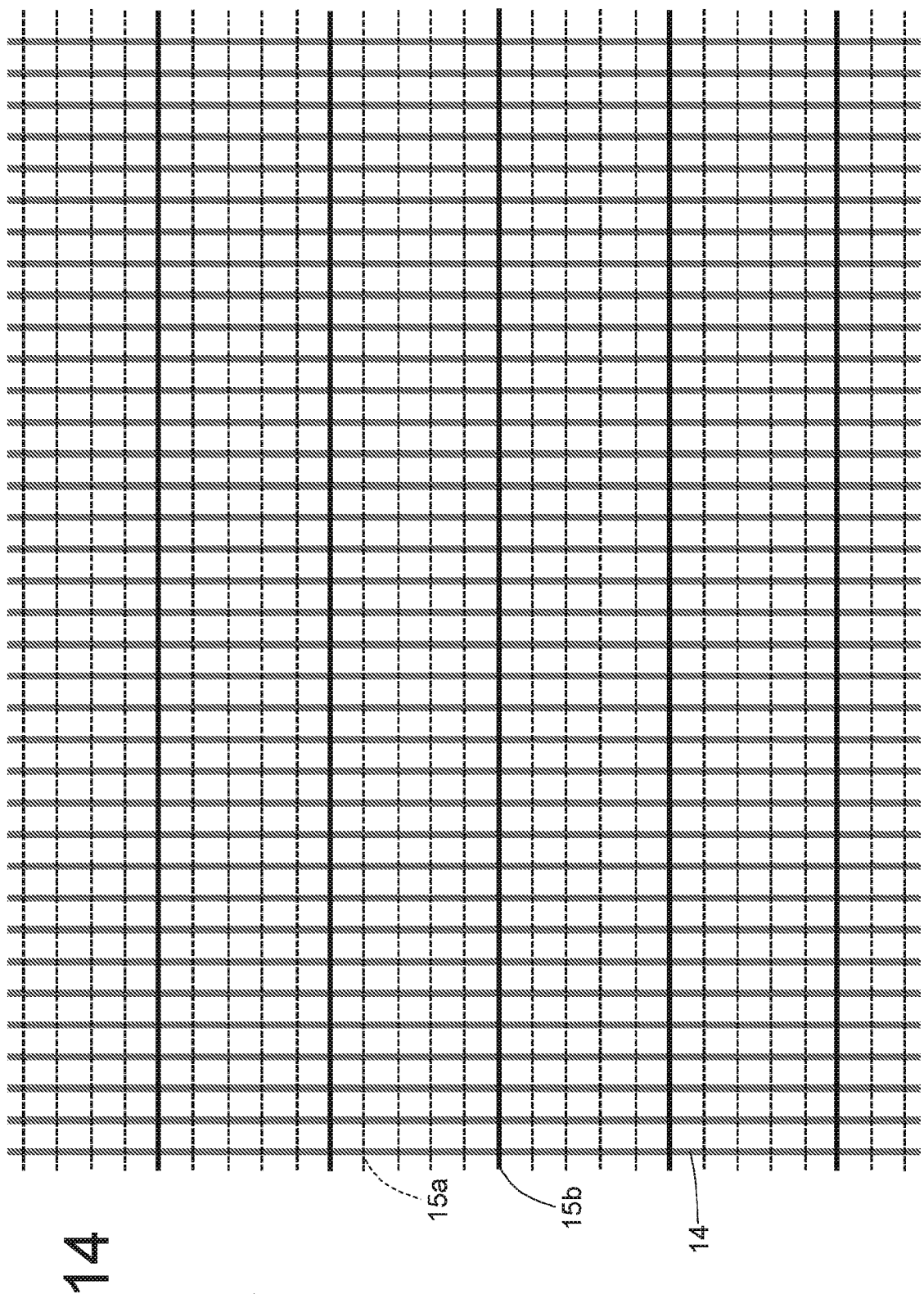
FIG. 14 is a schematic view of part of an outer reinforcement mesh of the air filter shown in FIG. 2 according to an alternative embodiment.
Figure 15:
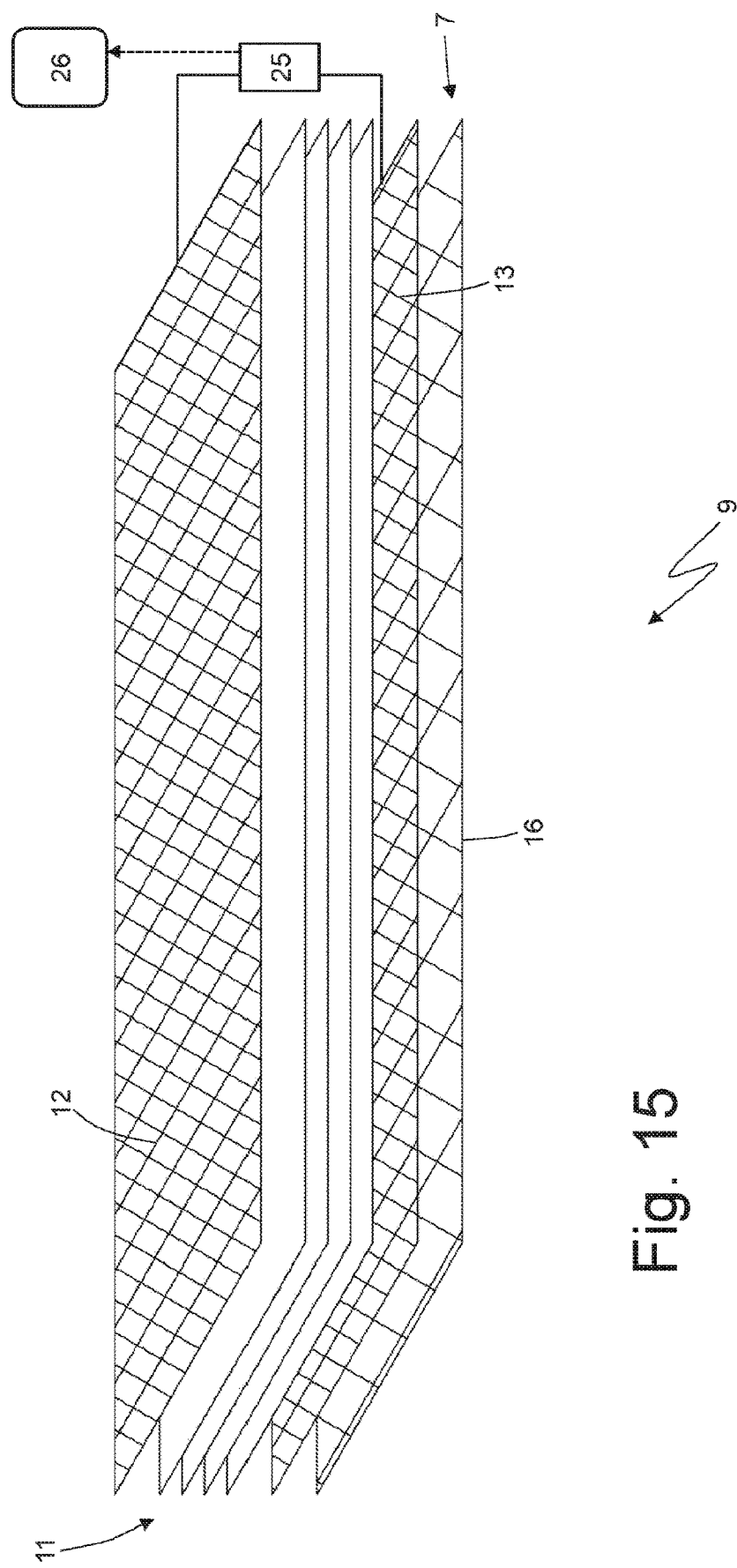
FIG. 15 is a schematic view of part of the air filter shown in FIG. 2 coupled to a capacitive sensor.

In the alternative embodiment illustrated in FIG. 14, the warp wires 14 of the outer reinforcement mesh 12 are electrified (i.e., the electric current can flow through them), they are made of a first metal material, preferably constantan, and are externally coated with an outer insulation 18 made of an electrically insulating material (also in this case, alternatively the weft wires 15 could be electrified instead of the warp wires 14). The weft wires 15, instead, are not electrified (i.e., the electric current I cannot flow through them), some are made of a plastic material that is not electrically conductive (denoted by reference numeral 15a in FIG. 14) and the rest are made of a second metal material (denoted by reference numeral 15b in FIG. 14), preferably copper, different from the first metal material, and are also externally coated with an outer insulation 18 made of an electrically insulating material. Preferably, the weft wires 15a made of the plastic material alternate with the weft wires 15*b* made of the second metal material (and externally coated with an outer insulation 18 made of an electrically insulating material). Furthermore, preferably, the weft wires 15*a* made of the plastic material are more numerous than the weft wires 15*b* made of the second metal material (for example with a ratio of 3-8 to 1). In the example illustrated in FIG. 14, the weft wires 15 are not electrified (i.e., the electric current I cannot flow through them) and comprise groups of four (alternatively of between three and eight) wires 15*a* made of the plastic material which alternate with a single weft wire 15*b* made of the second metal material.

According to a further embodiment that is not illustrated, the warp wires 14 of the outer reinforcement mesh 12 are electrified (i.e., the electric current can flow through them), they are made of a metal material, preferably constantan, and are externally coated with an outer insulation 18 made of an electrically insulating material (also in this case, alternatively the weft wires 15 could be electrified instead of the warp wires 14). The weft wires 15, instead, are not electrified (i.e., the electric current I cannot flow through them) and are all made of a plastic material that is not electrically conductive.

Clearly, the ideal situation from an electrical perspective (i.e., in terms of the electrical insulation) is that the non-electrified weft wires 15 are all made of a plastic material that is not electrically conductive; however, this situation is not so ideal from a mechanical perspective (i.e., in terms of the mechanical strength of the outer mesh 12) and therefore, between the wires 15*a* made of the plastic material, it is useful to have some weft wires 15*b* that are made of a metal material (preferably copper since this is more ductile than steel and more resistant to fatigue than steel at low temperatures, i.e., at temperatures of around zero degrees centigrade). Clearly, the weft wires 15*b* made of metal material should preferably be externally coated with an outer insulation 18 made of an electrically insulating material.

Figure 12:
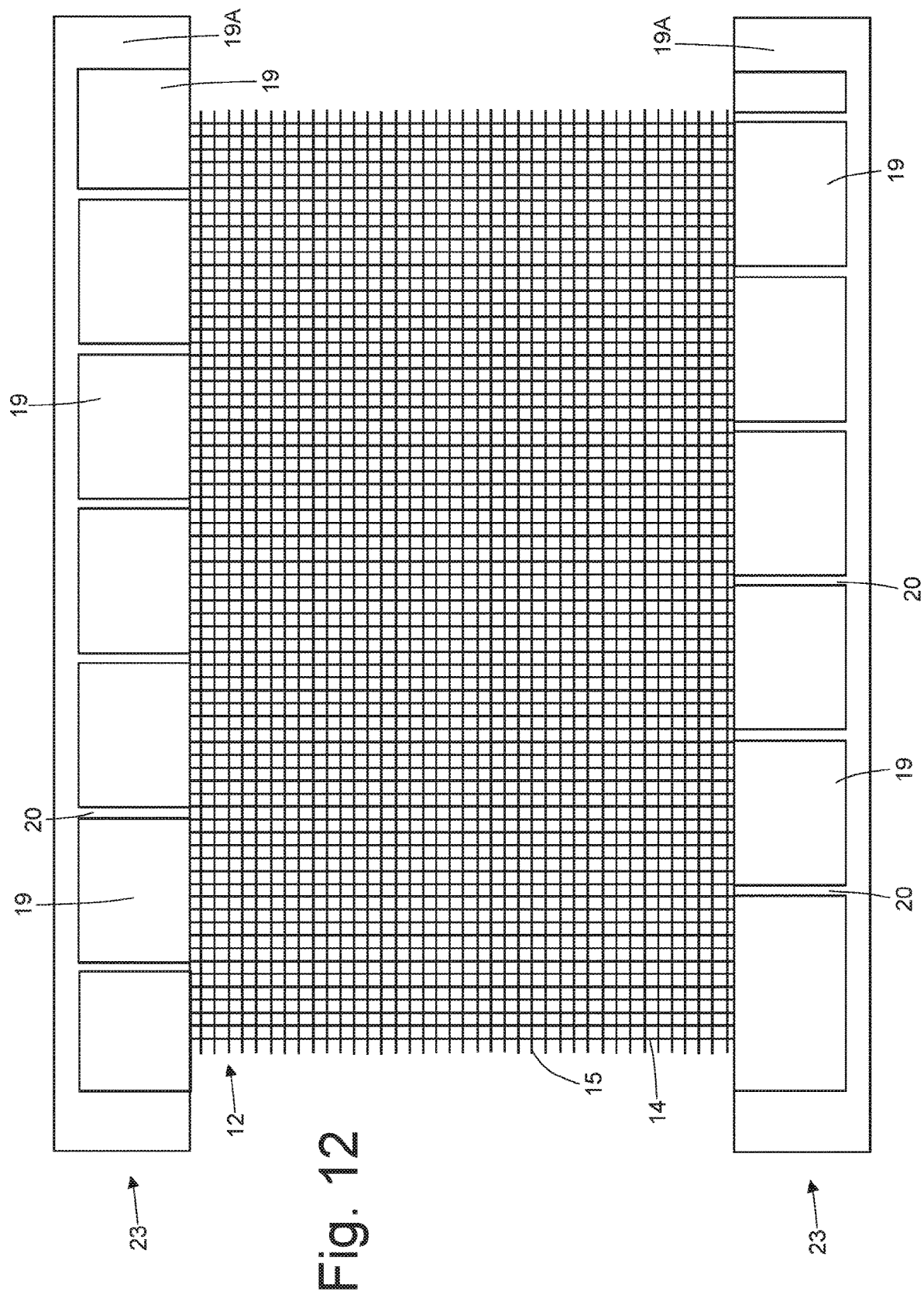
FIGS. 12 and 13 are schematic views of an alternative method for implementing the electrical connections of the outer reinforcement mesh of the air filter shown in FIG. 2.
Figure 13:
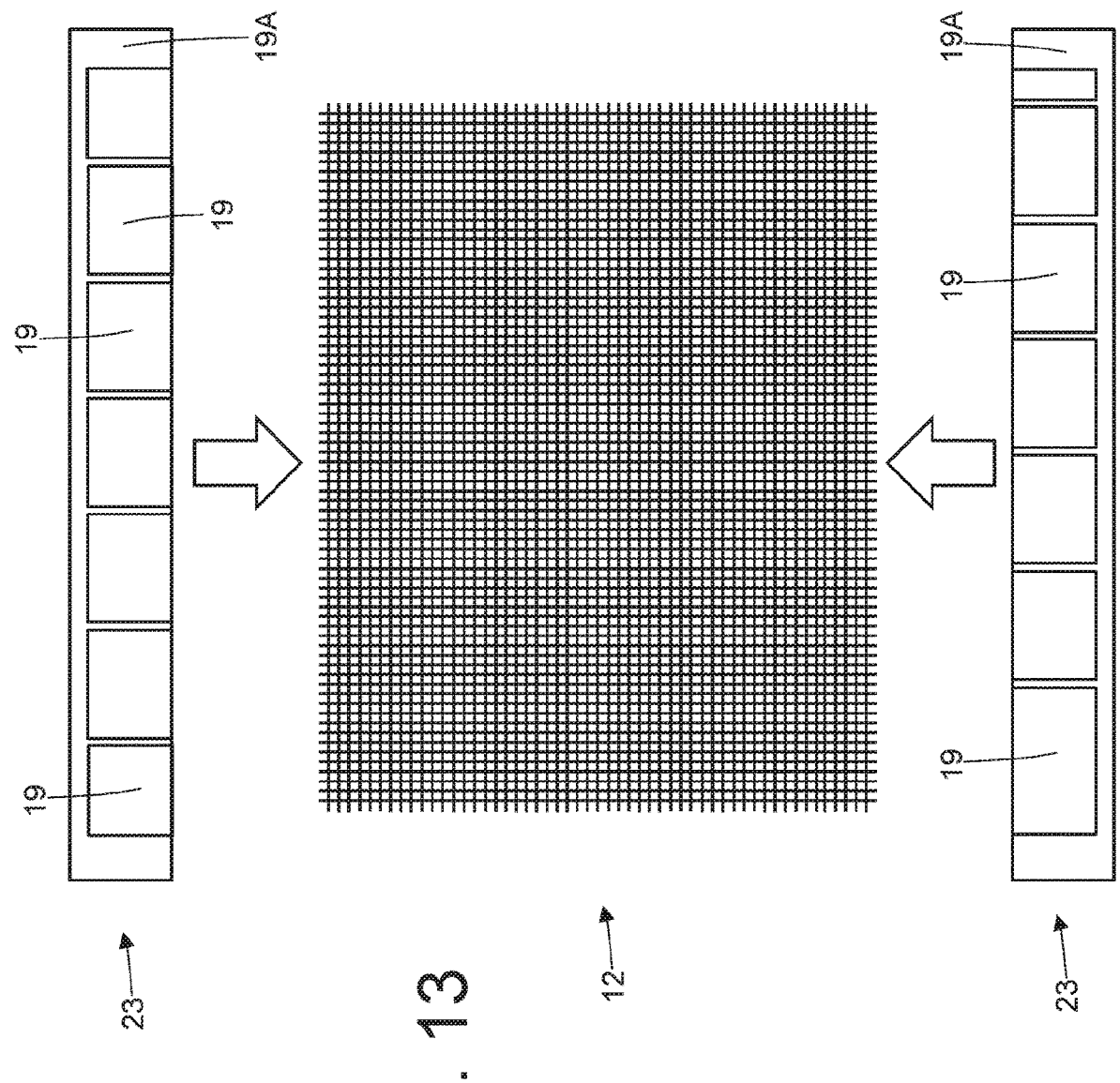

According to a possible embodiment illustrated in FIG. 12, there is a capacitive sensor 25 of a type known in the prior art which is designed to measure the capacitance between the two reinforcement meshes 12 and 13 (capacitance is a scalar physical quantity that describes the ability of a conductor body to increase its electric potential when it is supplied with an electric charge i.e., it measures its capacity for storing an electric charge). The capacitive sensor 25 communicates with a processing device 26 which determines a characteristic of the filtering material panel 11 based (also) on the capacitance between the two reinforcement meshes 12 and 13 measured by the capacitive sensor 25.

Preferably, the processing device 26 determines a percentage moisture content of the filtering material panel 11, a rate at which the air flows through the filtering material panel 11, and/or a level of clogging of the filtering material panel 11 on the basis of the capacitance between the two reinforcement meshes 12 and 13; clearly, the processing device 26 can determine all three of the aforesaid characteristics of the filtering material panel 11, it can determine two of the three aforesaid characteristics of the filtering material panel 11, or it can determine just one of the three aforesaid characteristics of the filtering material panel 11.

When the rate at which the air flows through the filtering material panel 11 changes, so too does the ability of the filtering material panel 11 to store electric charge and, as a consequence, the capacitance between the two reinforcement meshes 12 and 13 changes; therefore it is experimentally possible to determine a map that associates each value of the capacitance between the two reinforcement meshes 12 and 13 with a corresponding value of the rate at which the air flows through the filtering material panel 11. The rate at which the air flows through the filtering material panel 11 varies over short periods of time (even over just a few seconds), therefore the short-term change in the capacitance between the two reinforcement meshes 12 and 13 is used to determine the change in the rate at which the air flows through the filtering material panel 11. According to a preferred embodiment, the rate at which the air flows through the filtering material panel 11 is also determined on the basis of the speed of rotation of the turbine engine 2 by correlating the change in the capacitance between the two reinforcement meshes 12 and 13 with the change in the speed of rotation of the turbine engine 2.

When the moisture content of the filtering material panel 11 changes, so too does the ability of the filtering material panel 11 to store electric charge and, as a consequence, the capacitance between the two reinforcement meshes 12 and 13 changes; therefore it is experimentally possible to determine a map that associates each value of the capacitance between the two reinforcement meshes 12 and 13 with a corresponding moisture level of the filtering material panel 11. According to a preferred embodiment, the moisture content of the filtering material panel 11 is also determined on the basis of the temperature of the filtering material panel 11.

When the level of clogging of the filtering material panel 11 (i.e., the amount of foreign matter trapped in the filtering material panel 11) changes, so too does the ability of the filtering material panel 11 to store electric charge and, as a consequence, the capacitance between the two reinforcement meshes 12 and 13 changes; therefore it is experimentally possible to determine a map that associates each value of the capacitance between the two reinforcement meshes 12 and 13 with a corresponding level of clogging of the filtering material panel 11. The level of clogging of the filtering material panel 11 increases over a relatively long time (after several hours or several days of use), therefore the long-term change in the capacitance between the two reinforcement meshes 12 and 13 is used to determine the change in the level of clogging of the filtering material panel 11.

In the embodiment illustrated in the accompanying Figures, the air filter 9 comprises the outer reinforcement mesh 12 and the inner reinforcement mesh 13; according to alternative embodiments that are not illustrated, the air filter 9 could comprise the outer reinforcement mesh 12 only, the reinforcement mesh 13 only, a central reinforcement mesh only (sunk in the filtering material panel 11) or the central reinforcement mesh in addition to the reinforcement meshes 12 and 13; preferably only the central reinforcement mesh is electrified (if present, of course) or only the outer reinforcement mesh 12 (if there is no central reinforcement mesh). Generally speaking, electrifying the inner reinforcement mesh 13 is not advisable, as the inner reinforcement mesh 13 could only heat the filtering material panel 11 directly by heat conduction and not indirectly by means of the intake air (which only passes through the inner reinforcement mesh 13 after passing through the filtering material panel 11).

In the embodiment illustrated in the accompanying Figures, the air filter 9 has a flat, practically rectangular shape (and as a consequence the filtering panel 11 also has the same shape), but the air filter 9 (and thus the filtering panel 11) could clearly be of any other shape to adapt to the shape of the air intake; by way of example, the air filter 9 (and thus the filtering panel 11) could have a flat circular or elliptical shape, a cylindrical shape, a cone shape, a truncated-cone shape, etc.

The embodiment illustrated by way of example in the accompanying Figures refers to a helicopter 1, but the present invention may also be advantageously used in any type of aircraft or other vehicle, including road vehicles provided with an engine which must suck in air from the outside in order to operate (for example an off-road or all-terrain vehicle required to operate in extremely cold regions).

Numerous advantages are achieved with the helicopter 1 described above.

First, the helicopter 1 described above comprises an air filter 9 provided with a heating device 17 that is extremely effective and efficient (i.e., it is able to heat the filtering material panel 11 very effectively and efficiently) in that it is coupled to the filtering material panel 11 both directly (i.e., the heat generated by the heating device 17 reaches the filtering material panel 11 directly), and in a distributed manner (i.e., the heat generated by the heating device 17 reaches the entire surface of the filtering material panel 11 in a very uniform manner).

Moreover, the helicopter 1 described above comprises an air filter 9 provided with a heating device 17 that is particularly economical, lightweight and compact in that it exploits an element (the outer reinforcement mesh 12) that is already present in the air filter 9.

Lastly, the helicopter 1 described above comprises an air filter 9 that is able to determine in a sufficiently precise manner the condition (level of clogging) of the filtering material panel 11, the moisture content of the filtering material panel 11, and/or the rate at which the air flows through the filtering material panel 11, thanks to the measurement of the capacitance between the two reinforcement meshes 12 and 13.

The invention claimed is:

1. A vehicle (1) provided with an engine (2), at least one air intake (4) through which the engine (2) takes in the external air needed to operate, and an air filter (9), which is arranged downstream of the air intake (4);
    the air filter (9) comprises:
    at least one wave-shaped filtering material panel (11);
    an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
    an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
    a heating device (17), which is designed to heat the filtering material panel (11);
    wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12);
    wherein the electrified wires are externally coated with an outer insulation (18) made of an electrically insulating material; and
    wherein the heating device (17) is designed to cause the electric current (I) to circulate only through the warp wires (14) or only through the weft wires (15).

2. A vehicle (1) according to claim 1, wherein the heating device (17) is designed to cause the electric current (I) to circulate only through the warp wires (14).

3. A vehicle (1) according to claim 1, wherein at least some of the weft wires (15) or the warp wires (14) through which the heating device (17) does not cause the electric current (I) to circulate, i.e., the non-electrified wires, are made of a plastic material that is not electrically conductive.

4. A vehicle (1) according to claim 3, wherein some of the weft wires (15) or the warp wires (14) through which the heating device (17) does not cause the electric current (I) to circulate, i.e., the non-electrified wires, are made of the plastic material that is not electrically conductive and the remainder are made of a first metal material, preferably copper.

5. A vehicle (1) according to claim 4, wherein the weft wires (15) or the warp wires (14) through which the heating device (17) does not cause the electric current (I) to circulate, i.e., the non-electrified wires, comprise groups of wires (15a), preferably groups of between three and eight wires (15a), made of the plastic material, that alternate with at least one wire (15; 14), preferably with a single wire (15b), made of the first metal material.

6. A vehicle (1) according to claim 4, wherein the weft wires (15) or the warp wires (14) through which the heating device (17) causes the electric current (I) to circulate, i.e., the electrified wires, are all made of a second metal material, preferably constantan, different from the first metal material, preferably copper, of which some weft wires (15) or warp wires (14) through which the heating device (17) does not cause the electric current (I) to flow, i.e., the non-electrified wires, are made.

7. A vehicle (1) according to claim 1, wherein the heating device (17) comprises a plurality of collectors (19), each of which is electrically connected to the ends of a group of warp wires (14) or of weft wires (15) that are electrified, so as to connect the warp wires (14) or the weft wires (15) to one another, and is electrically insulated from the adjacent collectors (19).

8. A vehicle (1) according to claim 7, wherein the collectors (19) determine a partly parallel and partly series connection of the electrified wires (14; 15):
    the electrified wires (14; 15) are divided into a plurality of groups of electrified wires (14; 15), each consisting of the same number of electrified wires (14; 15);
    within the same group of electrified wires (14; 15), all the electrified wires (14; 15) are connected to one another in parallel thanks to two opposite collectors (19); and
    the different groups of electrified wires (14; 15) are connected to one another in series thanks to the fact that each collector (19) extends to the electrified wires (14; 15) of two adjacent groups, except for the initial collector (19) and the final collector (19).

9. A vehicle (1) according to claim 8, wherein between each collector (19) and the adjacent collectors (19) there is an empty space (20), which determines an electrical insulation.

10. A vehicle (1) according to claim 1, wherein the non-electrified wires (15) are made up of a first material, which is different from a second material making up the electrified wires (14).

11. A vehicle (1) according to claim 1 and comprising an air box (7), which has, on the inside, a cavity, which houses the air filter (9) and has an inlet opening coupled to the air intake (4) and an outlet opening coupled to an intake system (8) of the engine (2).

12. A vehicle (1) according to claim 1, wherein the reinforcement meshes (12, 13) do not have welding spots and are held together through the interlacing of the warp wires (14) with the weft wires (15).

13. A vehicle (1) according to claim 1, wherein the reinforcement meshes (12, 13) are provided with a further coating made of enamel or paint, which is applied to the reinforcement meshes (12, 13) after the weaving of said reinforcement meshes (12, 13).

14. A vehicle (1) according to claim 1, wherein the outer insulation (18) has a thickness ranging from 0.0005 mm to 0.08 mm.

15. A vehicle (1) according to claim 1, wherein all the wires (14, 15) of the outer reinforcement mesh (12) made of an electrically conductive metal material are provided with the outer insulation (18) regardless of whether or not they are electrified.

16. An air filter (9) designed to be installed in a vehicle (1) according to claim 1 and comprising:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
   a heating device (17), which is designed to heat the filtering material panel (11);
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12); and
   wherein the electrified wires are externally coated with an outer insulation (18) made of an electrically insulating material.

17. A vehicle (1) provided with an engine (2), at least one air intake (4) through which the engine (2) takes in the external air needed to operate, and an air filter (9), which is arranged downstream of the air intake (4); the air filter (9) comprises:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
   a heating device (17), which is designed to heat the filtering material panel (11);
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12);
   wherein the electrified wires are externally coated with an outer insulation (18) made of an electrically insulating material; and
   wherein the non-electrified wires (15) are made up of a first material, which is different from a second material making up the electrified wires (14).

18. A vehicle (1) provided with an engine (2), at least one air intake (4) through which the engine (2) takes in the external air needed to operate, an air filter (9), which is arranged downstream of the air intake (4), and an air box (7), which has, on the inside, a cavity, which houses the air filter (9) and has an inlet opening coupled to the air intake (4) and an outlet opening coupled to an intake system (8) of the engine (2); the air filter (9) comprises:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface;
   a heating device (17), which is designed to heat the filtering material panel (11); and
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12); and
   wherein the electrified wires are externally coated with an outer insulation (18) made of an electrically insulating material.

19. A vehicle (1) provided with an engine (2), at least one air intake (4) through which the engine (2) takes in the external air needed to operate, and an air filter (9), which is arranged downstream of the air intake (4); the air filter (9) comprises:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
   a heating device (17), which is designed to heat the filtering material panel (11);
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12);
   wherein the electrified wires are externally coated with an outer insulation (18) made of an electrically insulating material; and wherein the reinforcement meshes (12, 13) do not have welding spots and are held together through the interlacing of the warp wires (14) with the weft wires (15).

20. A vehicle (1) provided with an engine (2), at least one air intake (4) through which the engine (2) takes in the external air needed to operate, and an air filter (9), which is arranged downstream of the air intake (4); the air filter (9) comprises:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
   a heating device (17), which is designed to heat the filtering material panel (11);
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12);
   wherein the electrified wires are externally coated with an outer insulation (18) made of an electrically insulating material; and
   wherein the reinforcement meshes (12, 13) are provided with a further coating made of enamel or paint, which is applied to the reinforcement meshes (12, 13) after the weaving of said reinforcement meshes (12, 13).

21. A vehicle (1) provided with an engine (2), at least one air intake (4) through which the engine (2) takes in the external air needed to operate, and an air filter (9), which is arranged downstream of the air intake (4); the air filter (9) comprises:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
   a heating device (17), which is designed to heat the filtering material panel (11);
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12);
   wherein the electrified wires are externally coated with an outer insulation (18) made of an electrically insulating material; and
   wherein the outer insulation (18) has a thickness ranging from 0.0005 mm to 0.08 mm.

22. A vehicle (1) provided with an engine (2), at least one air intake (4) through which the engine (2) takes in the external air needed to operate, and an air filter (9), which is arranged downstream of the air intake (4); the air filter (9) comprises:
   at least one wave-shaped filtering material panel (11);
   an outer reinforcement mesh (12), which is pleated, is made up of a plurality of weft wires (15) and a plurality of warp wires (14) interlaced with one another, and rests against an outer surface of the filtering material panel (11), through which the air taken in enters so as to flow through said filtering material panel (11);
   an inner reinforcement mesh (13), which is pleated, is made up of a plurality of weft wires (15) and a plurality of warp wires (14) interlaced with one another, and rests against an inner surface of the filtering material panel (11), which is opposite the outer surface; and
   a heating device (17), which is designed to heat the filtering material panel (11);
   wherein the heating device (17) is electrically connected to a group of electrified wires of the outer reinforcement mesh (12) and is designed to cause an electric current (I) to flow through said electrified wires, so as to generate heat, due to the Joule effect, on the inside of said outer reinforcement mesh (12);
   wherein the electrified wires are externally coated with an outer insulation (18) made of an electrically insulating material; and
   wherein all the wires (14, 15) of the outer reinforcement mesh (12) made of an electrically conductive metal material are provided with the outer insulation (18) regardless of whether or not they are electrified.

* * * * *